United States Patent [19]
Ruget

[11] 3,880,066
[45] Apr. 29, 1975

[54] APPARATUS FOR SHELLING VEGETABLE PRODUCTS

[75] Inventor: Gabriel Ruget, Saint-Etienne, France

[73] Assignee: Creusot-Loire, Paris, France

[22] Filed: Aug. 14, 1973

[21] Appl. No.: 388,165

[30] Foreign Application Priority Data
Aug. 30, 1972  France .............................. 72.30727

[52] U.S. Cl. ..................... 99/468; 99/567; 99/570
[51] Int. Cl.² ...................... A23n 7/00; B07b 4/00
[58] Field of Search ............................ 99/467–469, 99/471, 567–568, 569, 570, 572, 584, 600–601, 602, 605, 609

[56] References Cited
UNITED STATES PATENTS

| | | | |
|---|---|---|---|
| 1,445,742 | 2/1923 | Blair | 99/467 X |
| 2,534,648 | 12/1950 | Wilbur | 99/467 X |
| 2,631,099 | 3/1953 | Bonotto | 99/467 X |
| 3,276,495 | 10/1966 | Calfee | 99/468 |
| 3,328,894 | 7/1967 | Smith, Jr. | 99/468 X |
| 3,329,079 | 7/1967 | Palm | 99/468 |
| 3,714,886 | 2/1973 | Worden | 99/467 |

*Primary Examiner*—Robert W. Jenkins
*Assistant Examiner*—Arthur O. Henderson
*Attorney, Agent, or Firm*—Cameron, Kerkam, Sutton, Stowell & Stowell

[57] ABSTRACT

Apparatus for shelling vegetable products comprising a chamber for subjecting the product to successive compression and expansion, the chamber having a discharge orifice closable by a valve member, the opening of which to remove the product causes the expansion of the chamber.

6 Claims, 2 Drawing Figures

APPARATUS FOR SHELLING VEGETABLE PRODUCTS

The present invention relates to apparatus for the shelling of vegetable products, and more particularly for the hulling of oleaginous or edible grains, for example, ground-nut, sunflower, soya, rice or pea and dry fruit, for example, hazel-nuts, almonds or coffee-berries. For such products, the hulling operation comprises extracting one or more kernals by breaking an outer envelope, that is a pod, hull, husk or shell, depending on the nature of the product or fruit.

A process for shelling vegetable products is known which employs variations in the pressure of a gaseous fluid in a chamber containing the products. In accordance with this process, the products to be shelled are firstly loaded into the chamber and a gaseous fluid is then compressed in the chamber to a pressure P1, which is greater than atmospheric pressure P0, and this pressure P1 is maintained in the chamber for a certain time. This compression phase is followed by an expansion phase, during which the gaseous fluid is allowed to escape until atmospheric pressure P0 is reestablished in the chamber. A mixture of kernels, portions of broken envelopes and unshelled products is then removed from the chamber for sorting.

The products which can be shelled by this process have, between the kernel and the envelope, a space which is normally filled with air at atmospheric pressure. As the envelope of the product is always porous, this internal pressure will vary during the compression and expansion cycle. If the internal pressure between the kernel and the envelope is $Pi$ and the external pressure in the immediate vicinity of the product, acting on the outer surface of the envelope, is $Pe$, then during the compression phase pressure $Pe$ increases from P0 to reach a value P1. A small quantity of the gas from the chamber penetrates to the space between the kernel and the envelope by diffusion through the envelope, and internal pressure $Pi$ increases from the value P0, reaching the value P1 if the compression phase is long enough. At each moment during this compression phase, we therefore have $Pi \leq Pe$; during this phase, the envelope of the product therefore tends to be compressed by the resulting pressure differential.

During the expansion phase, on the other hand, external pressure $Pe$ decreases from P1 to P0. The gas which has accumulated between the kernel and the envelope tends to escape, by diffusion through the envelope, and internal pressure $Pi$ decreases towards P0. However, at each moment of the expansion phase, $Pi \geq Pe$ and the envelope of the product tends to be enlarged by the pressure differential.

The envelopes of the products are more resistant to the compression stress than the enlargement stress. If the resulting pressure differential $Pi-Pe$ exceeds a certain threshold during expansion, the envelope bursts, releasing the kernel. Experience shows that it is fairly difficult to obtain these bursting conditions and the proportion of shelled products in each chamber load at the end of a compression expansion cycle is generally small. U.S. Pat. No. 3,276,495 describes an apparatus which carries out such a process. To improve the efficiency of such a machine, it has been proposed, in French Pat. Nos. 2,030,019 and 2,052,101, to subject a chamber load of the products to be peeled to a series of at least 3 successive compression and expansion cycles, in order to cause fracture of the envelopes by oscillation fatigue. However, the efficiency of such repetitive cycle machines is still insufficient when products with very porous shells, like ground-nuts, for example, have to be peeled. In fact, in this case, the rate of increase of external pressure $Pe$ is too low relative to the rate of diffusion of the fluid through the shell and the resulting pressure $Pe-Pi$ which tends to compress the envelopes is too small. Similarly, during expansion, and although the chamber pressure drops considerably faster than it can be increased during compression, the rate of diffusion through the shell renders the pressure differential $Pi-Pe$ insufficient to break the shell.

The object of the present invention is to correct these disadvantages and to obtain a greater shelling efficiency. By providing an apparatus which uses the potential energy of the gases compressed in the chamber to cause expansion and pressure drop rates may exceed 500 bar/second during expansion.

According to the present invention there is provided apparatus for shelling vegetable products having an envelope containing at least one kernal by the sequential steps of placing said product in a gaseous atmosphere; increasing the pressure of said atmosphere to a super-ambient value; maintaining said pressure at said super-ambient value for a given period of time; and rapidly reducing said pressure from said super-ambient value; the apparatus comprising a chamber having a charging orifice closable in a fluid-tight manner by a charging valve member and a discharge orifice closable in a fluid-tight manner by a discharge valve member, the arrangement being such that with said vegetable products in the chamber and the pressure of the gaseous atmosphere of the chamber at said super-ambient value, the opening of the discharge orifice by movement of the discharge valve member causes said rapid reduction in said gas pressure and the ejection of said product from the chamber by the expanding gaseous atmosphere.

In accordance with a preferred embodiment, the apparatus also includes means for the shock-free braking and channelling of the products to the output of the apparatus after their ejection from the chamber.

Also according to the invention there is provided plant for shelling vegetable products comprising the shelling apparatus according to the invention; a device for supplying the chamber with pressurised gas, means for controlling and monitoring the different sequences of the operating cycle of the apparatus, a hopper for products to be shelled, means for loading the hopper with such products, means for sorting the products into homogeneous categories at the output of the apparatus and means for recycling unshelled products.

The invention will be better understood from the following description of a preferred embodiment thereof, given by way of example only, reference being had to the accompanying drawings, wherein.

Figure 2:
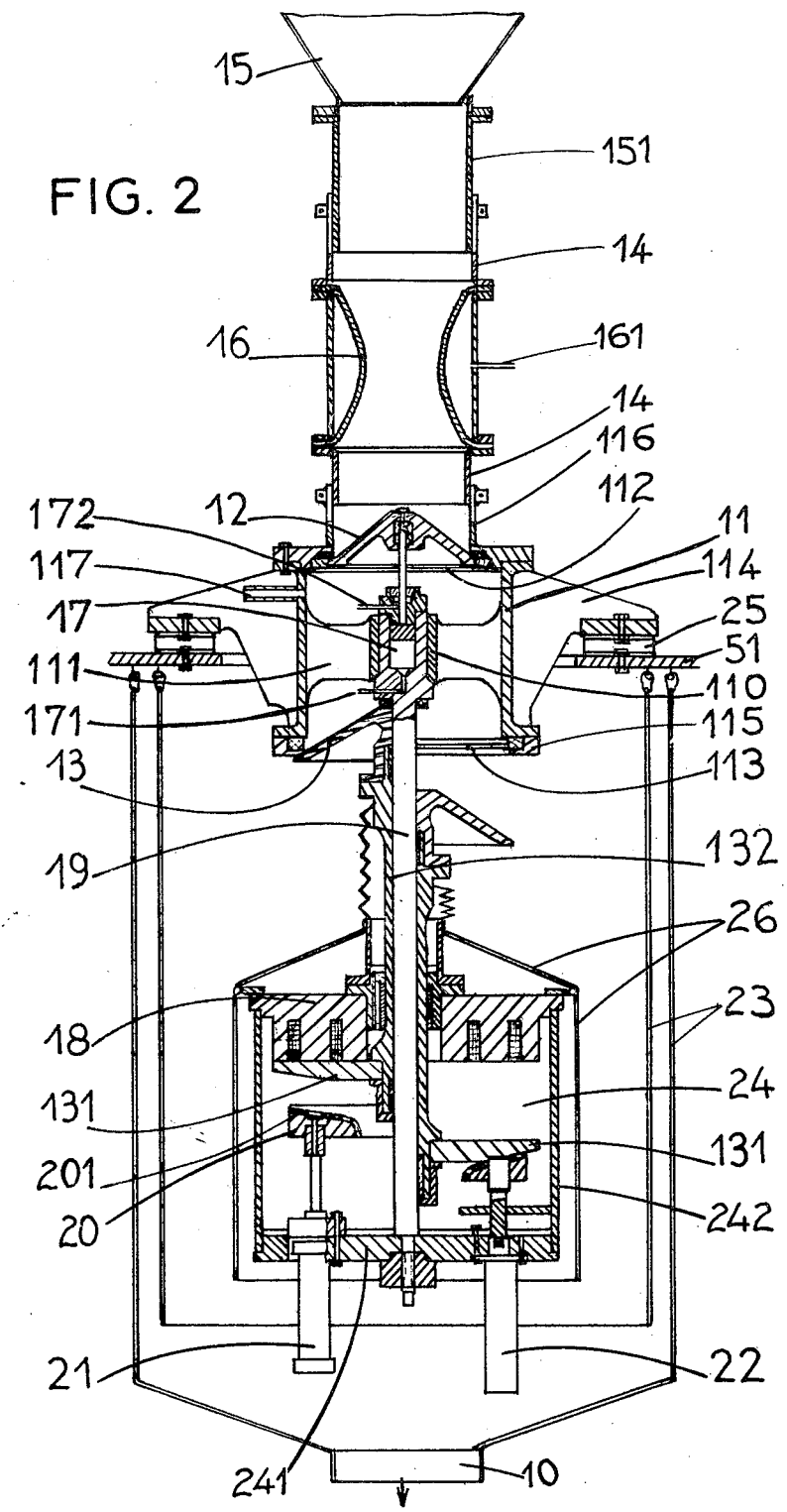
FIG. 2 is a longitudinal compound section of one embodiment of shelling apparatus according to the invention, the left portion of the Figure showing the apparatus during the compression phase and the right portion showing the same apparatus during the expansion phase.

With reference firstly to FIG. 2, the shelling apparatus comprises a cylindrical decompression chamber 11 with a vertical axis, having an axial hub 110 connected to its periphery by radial arms 111. Chamber 11 rests by external arms 114 and through damping block 25 on a horizontal cross-piece 51 of a frame. Chamber 11 has a charging orifice 112 closable by a charging valve member 12 operated by a double-acting ram 17 arranged in the hub. It also has a discharge orifice 113 closable by a discharge valve member 13. Control apparatus 24 controls and damps the motion of valve 13. Control apparatus 24 is fixed by its base 241 to a vertical shaft 19 rigidly attached to hub 110 of the chamber 11. Valve member 13 is connected to a plate 131 by a hollow shaft 132 which slides on shaft 19; it can be held in its closed position against its seat 115 by an electro-magnet 18 having an annular yoke which, when the magnet is excited, attracts plate 131, which constitutes its armature. Electro-magnet 18 is rigidly attached to base 241 by sleeve 242. Control apparatus 24 also includes a circular stop 20, the upper surface of which is covered with an elastic coating 201 and which is carried by the rods of two shock-absorbers 21, the bodies of which are rigidly attached to base 241. Rams 22, the bodies of which are also rigidly attached to base 241, are disposed between two shock-absorbers 21.

The apparatus also includes two skirts 23, which are co-axial with chamber 11 and suspended from horizontal cross-piece 51 of the frame of the apparatus. Skirts 23 are made of elastic materials. The inner skirt is formed by juxtaposition of narrow, vertically arranged strips of material. The outer skirt may have a softer coating at right-angles to the impact of the products and its lower portion is in the form of a funnel with a relatively small axial orifice 10. The whole of control apparatus 24 is surrounded by a case 26 of rubbery material.

In the upper portion of the apparatus, feed hopper 15 is extended by a cylindrical ferrule 151 coaxial with another cylindrical ferrule 116 extending to the inlet orifice 112 of chamber 11. The two ferrules 151 and 116 are connected by a sliding sleeve 14 which includes a diaphragm valve 16 operated by the supply of pressurised fluid through piping 161. The position of the diaphragm valve is adjustable relative to the charging orifice so that the charge introduced into the chamber at each cycle may be adjusted.

An operating cycle of the apparatus will now be described. In the initial state, valve member 12 is held in its closed position, as shown in the Figure, by ram 17 which is supplied with compressed air through piping 171 while piping 172 is exhausting. Valve 13 is held in the closure position, as shown in the left portion of FIG. 2, by electro-magnet 18 which is excited and attracts the plate 131. Circular stop 20 is in the upper position, as shown in the left portion of the Figure, under the influence of shock absorbers 21. Valve 16 is in the open position and the products to be shelled, contained in hopper 15, fall as far as valve member 12, filling sleeve 151, valve 16 and sleeve 116.

The cycle is commenced with closure of valve 16 which, under the influence of the compressed air introduced through piping 161, laterally compresses the column of products passing through it. The pressure is adjusted to a maximum value for which there is no risk of the products being crushed by the valve diaphragm. When valve 16 has been so closed, valve member 12 is opened by reversing the direction of supply of working fluid to the double-acting ram 17. The load of products contained between valve 16 and valve member 12 then runs into chamber 11 and is retained by valve member 13. Valve member 12 is then re-closed.

When valve member 12 has been re-closed, compressed air is admitted to chamber 11 through piping 117 and the pressure in the chamber is established at value P1. When the pressure has been held in the chamber for a sufficient time, the compressed air supply through piping 117 is shut off and the direction of the excitation current of electro-magnet 18 is reversed. As a result, the attractive force of electro-magnet 18 on armature 131 is momentarily zero and the air-pressure in chamber 11 drives valve member 13 sharply downwards. The fall of valve member 13 is at first free and then, when armature 131 comes into contact with stop 20, this fall is braked by shock-absorbers 21. As soon as valve 13 is opened, the products which were resting in the chamber on the upper surface of valve member 13, blocking the discharge orifice 113, are ejected from the chamber by the compressed air. The free stroke of valve 13 enables a very rapid expansion of the compressed air, which may exceed 500 bars per second, and sharp ejection of the products to be obtained. Once they have been ejected from the chamber, the products are braked by inner elastic skirt 23 and then halted by the outer skirt and channelled by the latter towards outlet orifice 10.

It may be noted that the arrangement of the discharge orifice of the chamber and the form of valve member 13 impart divergent ejection paths to the products, which reduces the risk of collision two shelled elements; the proportion of broken kernels in the shelled products is thus reduced. On the other hand, the structure of the apparatus allows the shelled kernels not to meet any rigid element between their ejection from the chamber and the outlet of the apparatus; rubberised case 26 protects them from impact against control assembly 24 and reception skirts 23, made of soft material, by absorbing the shocks also avoid breakage of the kernels.

The pressure in valve 16 is then reduced to open the valve and the products in hopper 5 refill the piping between valve 16 and valve member 12, thus preparing a new load for processing.

After ejection of the products from the chamber, Rams 22 are supplied with working fluid in the direction which causes them to re-lift armature 131 to the attraction zone of electro-magnet 18 and armature 131 then resumes its attracted position, corresponding to the closed position of valve 13 against its seat 115. Shock-absorbers 21, compressed under the influence of the impact of armature 131 against stop 20, use their stored energy to raise stop 20 back to its waiting position, as shown in the left portion of FIG. 2.

The description of the operation of the apparatus is given above for successive manual command of its different elements. The linkage of the various sequences of the cycle may, of course, be rendered automatic by conventional programming techniques known within the scope of the art.

Figure 1:
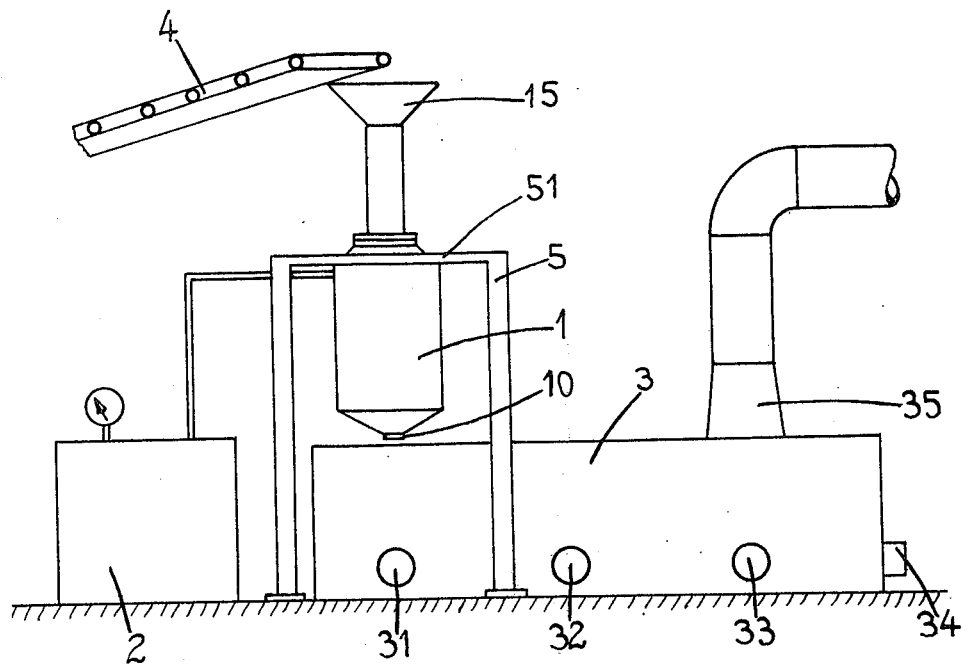
FIG. 1 is a diagrammatic elevation of one embodiment of shelling plant constructed in accordance with the invention.

FIG. 1 shows a shelling plant employing the apparatus described above. Such a plant includes a shelling apparatus 1, with its feed-hopper 15 over it, and a supply compressor 2, a sifter 3 and a belt elevator 4. It has already been observed that apparatus 1 rests elastically on frame 5, so as to reduce transmission to the ground of the shocks and vibrations produced by the successive expansions at each operating cycle of the machine. Compressor 2 supplies compressed air for pressurising the chamber of apparatus 1. Elevator 4 supplies hopper 15 with products to be shelled. At the output of the apparatus, the products fall from orifice 10 into sifter 3 which sorts them, for example into fines and bran, which leave at 31, into fragments which leave at 32 and into kernels which are collected at 33, while the shelling waste is collected at 34 and the shells are removed by suction at 35. Of course, any unshelled products collected at 34 may be re-cycled by deposition on elevator 4, by conventional handling means not shown in the Figure.

The invention is not strictly limited to the embodiment which has been described by way of example, but also covers embodiments which lie within the scope of the invention.

What is claimed is:

1. Apparatus for shelling vegetable products having an envelope containing at least one kernel by the sequential steps of placing said product in a gaseous atmosphere; increasing the pressure of said atmosphere to a super-ambient value; maintaining said pressure at said super-ambient value for a given period of time; and rapidly reducing said pressure from said super-ambient value; the apparatus comprising a chamber having a charging orifice closable in a fluid-tight manner by a charging valve member and a discharge orifice closable in a fluid-tight manner by a discharge valve member, the arrangement being such that with said vegetable products in the chamber and the pressure of the gaseous atmosphere of the chamber at said super-ambient value, the opening of the discharge orifice by movement of the discharge valve member causes said rapid reduction in said gas pressure and the ejection of said product from the chamber by the expanding gaseous atmosphere and spaced elastic cylindrical skirts coaxial with said chamber receiving and braking the products from the discharge valve member.

2. Apparatus in accordance with claim 1, wherein the discharge valve member in the closed position is held in exterenal contact with a seat formed on the discharge orifice by a closure means, opening of the discharge valve member being caused by the internal gas pressure when the closure means are rendered inoperative.

3. Apparatus in accordance with claim 1 wherein the chamber is cylindrical with a vertical axis, and wherein the discharge valve member constitutes the base of the chamber and is in the form of a cone, the vertex of which is directed towards the inside of the chamber, the discharge valve member being held in its closed position against its seat by a device applying a vertical, upwardly directed thrust which can be instantaneously annulled, the discharge valve member also being provided with guide means, and braking and shock-absorption means which become operative after a first portion of free stroke of the discharge valve member after stoppage of the holding thrust.

4. Apparatus in accordance with claim 3, wherein the device exercising a thrust on the closure device in its closed position is an electro-magnet rigidly attached to the chamber through a vertical, axial support shaft, acting on an armature rigidly attached to the discharge valve member by a hollow shaft sliding on the support shaft of the electro-magnet.

5. Apparatus in accordance with claim 3 wherein the charging orifice is at the top of the chamber and is closable by a charging valve member which when closed is in internal contact with a seat, the charging valve member being movable between its open position and its closed position by a compressed air actuated ram arranged inside the chamber.

6. Apparatus in accordance with claim 1 wherein the piping for bringing the products to the chamber includes a diaphragm closure valve, the position of this diaphragm valve being vertically adjustable above the charging orifice valve, enabling the quantity of products introduced into the chamber at each cycle to be adjusted.

* * * * *